US010064012B1

(12) United States Patent
Boston et al.

(10) Patent No.: US 10,064,012 B1
(45) Date of Patent: Aug. 28, 2018

(54) MULTI-FLOOR AND MULTI-BUILDING ULTRA-WIDEBAND (UWB) LOCATION DEVICE, SYSTEM, AND METHOD

(71) Applicant: The United States of America, as represented by the Secretary of the Air Force, Washington, DC (US)

(72) Inventors: Jonathan D. Boston, Fairborn, OH (US); Brandon J. Smith, Richmond Heights, MO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/460,541

(22) Filed: Mar. 16, 2017

(51) Int. Cl.
| | |
|---|---|
| *H04W 4/02* | (2018.01) |
| *H04M 1/725* | (2006.01) |
| *H04W 4/04* | (2009.01) |
| *G01S 5/06* | (2006.01) |

(52) U.S. Cl.
CPC .............. *H04W 4/023* (2013.01); *G01S 5/06* (2013.01); *H04M 1/72572* (2013.01); *H04W 4/043* (2013.01)

(58) Field of Classification Search
CPC ......... H04W 4/04; H04W 64/00; H04W 4/02; H04W 84/18
USPC ........ 455/456.1, 456.2, 456.3, 457; 340/376, 340/457
See application file for complete search history.

(56) References Cited

U.S. PATENT DOCUMENTS

| | | | |
|---|---|---|---|
| 7,728,729 B2 | 6/2010 | Christopher | |
| 8,395,968 B2 | 5/2013 | Vartanian et al. | |
| 2007/0241965 A1 | 10/2007 | Kolavennu et al. | |
| 2011/0281538 A1* | 11/2011 | Morrison | H04H 60/46 455/185.1 |
| 2012/0214507 A1* | 8/2012 | Vartanian | G01S 15/08 455/456.1 |
| 2016/0282442 A1* | 9/2016 | O'Mahony | G01S 5/0036 |
| 2017/0245236 A1* | 8/2017 | Heldmaier | H04W 64/00 |

OTHER PUBLICATIONS

Harmer et al., "An Ultra-Wide Band Indoor Personnel Tracking System for Emergency Situations (Europcom)," Radar Conference, EuRAD 2008, Oct. 30-31, 2008, 4 pages.
(Continued)

*Primary Examiner* — Sam Bhattacharya
(74) *Attorney, Agent, or Firm* — AFMCLO/JAZ; Charles Figer, Jr.

(57) ABSTRACT

An ultra-wideband (UWB) tracking device, system, and method are provided. The system can include a plurality of anchor transmitters, at least one location device, and a processing system. The anchor transmitters can be arranged in predetermined positions, include a unique identifier, and each transmit an ultra-wide band (UWB) signal including the unique identifier. The location device can receive the UWB signals, and transmit the unique identifiers. The processing system can include a digital map that stores the unique identifiers and the predetermined positions. The processing system can receive the unique identifiers from the location device, and identify a position of the location device based on a comparison of the unique identifiers received and the stored unique identifiers on the digital map.

20 Claims, 2 Drawing Sheets

(56) References Cited

OTHER PUBLICATIONS

Maneerat et al., "An Enhanced Floor Estimation Algorithm for Indoor Wireless Localization Systems Using Confidence Interval Approach," World Academy of Science, Engineering and Technology, International Journal of Computer, Electrical, Automation, Control and Information Engineering vol. 8, No. 7, pp. 1182-1186, 2014.

* cited by examiner

MULTI-FLOOR AND MULTI-BUILDING ULTRA-WIDEBAND (UWB) LOCATION DEVICE, SYSTEM, AND METHOD

GOVERNMENT INTEREST

The invention described herein may be manufactured and used by or for the Government of the United States for all government purposes without the payment of any royalty.

BACKGROUND

Field of the Invention

The embodiments herein generally relate to a multi-floor, multi-building, ultra-wideband (UWB) tracking device, system, and method of using the same.

Background of the Invention

Indoor tracking systems can have limitations that restrict their general or specific utility for particular situations. Systems that use signal strength from anchors such as Bluetooth® and WiFi® systems, for example, may not be able to accurately locate or track a desired object due to variabilities in the environment that may affect the radio frequency (RF) signal in use. Systems that use radio frequency identification (RFID) beacons and readers, meanwhile, may not be able to track moving objects due to the range limitations of the technology. Increasing the range of such systems may be possible, but usually only at a substantial increase in cost that does not also improve the system's accuracy. Inertial guidance systems may be able to track well over short distances, but these systems can lose accuracy rapidly over time without frequent recalibration. Also in existence are external radio tracking systems that can use high powered transmissions to locate objects, but these systems can be expensive, may only be temporarily available during certain situations, and may not be able to distinguish floor level in a multi-floor building when attempting to track a desired object.

The U.S. Federal Communications Commission (FCC) allows ultra-wideband (UWB) technology for indoor and short-range outdoor communication, but with restrictions on their power and frequency emissions. Such limitations can make available the large channel capacity of UWB transmissions over short ranges and without creating interference with nearby 'narrowband' transmissions. While ultra-wide band (also referred to as UWB, ultra-wideband, and ultra-band) tracking systems may exist, these systems typically rely on a fixed infrastructure requiring continuous power, programming, and network connections to locate and track objects in relatively large and open areas. Such systems can be expensive to install and deploy, especially across multiple buildings having multiple floors.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides a location device. The location device includes a receiver configured to receive a plurality of ultra-wide band (UWB) signals from a plurality of anchor transmitters; a distance unit configured to determine a distance to each anchor transmitter using the received plurality of UWB signals; a position unit configured to analyze the distance to each anchor transmitter and determine a position in space based on the distance to each anchor transmitter; and a user interface configured to notify a user of the determined position in space.

The location device can further include a storage device configured to store at least one anchor transmitter identifier and a predetermined position in space for each anchor transmitter. The position unit can be further configured to determine the position in space based on the predetermined position in space for each anchor transmitter. The received plurality of UWB signals from the plurality of anchor transmitters can comprise the anchor transmitter identifier for each anchor transmitter. Each received UWB signal can comprise a predetermined position in space of the corresponding anchor transmitter for each anchor transmitter, and the position unit can be configured to determine the position in space based on the received predetermined position in space for each anchor transmitter. The plurality of anchor transmitters can comprise at least three anchor transmitters.

The location device can further include a storage device configured to store a map of a position. The position in space can be mapped to a position on the map via the user interface. The receiver can be configured to receive the plurality of UWB signals from the plurality of anchor transmitters inside a building, and the position can be inside the building. The distance unit can be configured to analyze a time of flight (TOF) of the received plurality of UWB signals to determine the distance to each anchor transmitter based on the TOF analyses. The position unit can be configured to analyze a first determined position in space at a first time and a second determined position in space at a second time, and track a path in space based on the first and second determined positions in space.

In the embodiment, a mobile device can include the location device and a mobile housing. The location device can be disposed in the mobile housing.

Another embodiment provides a tracking system. The system includes a plurality of anchor transmitters, at least one location device, and a processing system. The plurality of anchor transmitters are arranged in predetermined positions, wherein each anchor transmitter comprises a unique identifier, and wherein the plurality of anchor transmitters are each configured to transmit an ultra-wide band (UWB) signal comprising the unique identifier. The at least one location device is configured to receive the UWB signals comprising the unique identifiers, and is configured to transmit the unique identifiers. The processing system comprises a digital map that stores the unique identifiers and the predetermined positions, wherein the processing system is configured to receive the unique identifiers from the at least one location device, and wherein the processing system is configured to identify a position of the at least one location device based on a comparison of the unique identifiers received by the at least one location device and the stored unique identifiers on the digital map.

The processing system can further include a storage device configured to store a plurality of anchor transmitter identifiers and a predetermined position in space for each anchor transmitter. The processing system can be configured to determine a position of the at least one location device in space based on the predetermined position in space for each anchor transmitter. The at least one location device can be configured to receive the plurality of UWB signals from the plurality of anchor transmitters inside a building, wherein the plurality of anchor transmitters can be disposed inside the building, and wherein the tracked position can be inside the building. The plurality of anchor transmitters can include at least three anchor transmitters. The processing system can be configured to analyze a time of flight (TOF) of received plurality of UWB signals to determine the position of the at least one location device. The at least one location device can be configured to transmit to the processing system a time of flight (TOF) of the plurality of UWB signals received by the at least one location device.

Another embodiment provides a method of locating. The method includes arranging a plurality of anchor transmitters in a plurality of predetermined positions, wherein each anchor transmitter comprises a unique identifier; storing, in a processing system, each unique identifier and the predetermined position for each anchor transmitter on a digital map stored; communicatively linking at least one location device to the digital map; positioning the at least one location device in communicative proximity to the plurality of anchor transmitters; transmitting ultra-wide band (UWB) signals comprising the unique identifier from the plurality of anchor transmitters; receiving, in the at least one location device, the UWB signals comprising the unique identifiers from at least a portion of the plurality of anchor transmitters; transmitting the unique identifiers to the processing system via the at least one location device; and identifying, via the processing system, a position of the at least one location device based on a comparison of the unique identifiers received by the at least one location device and the stored unique identifiers on the digital map.

In the method, the identifying the position of the at least one location device can include using trilateration based on the portion of the plurality of anchor transmitters comprising at least three anchor transmitters. The method can further include identifying, via the processing system, a path in space of the at least one location device based on a comparison of the identified position of the at least one location device at predetermined intervals of time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

The embodiments disclosed herein and the various features and advantageous details thereof are explained more fully with reference to the non-limiting embodiments illustrated in the accompanying drawings and detailed in the following description. Descriptions of well-known components and processing techniques are omitted to not unnecessarily obscure what is disclosed. Examples are intended merely to facilitate an understanding of ways in which the embodiments may be practiced and to further enable those of skill in the art to practice them. Accordingly, the examples should not be construed as limiting the scope of the embodiments herein.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
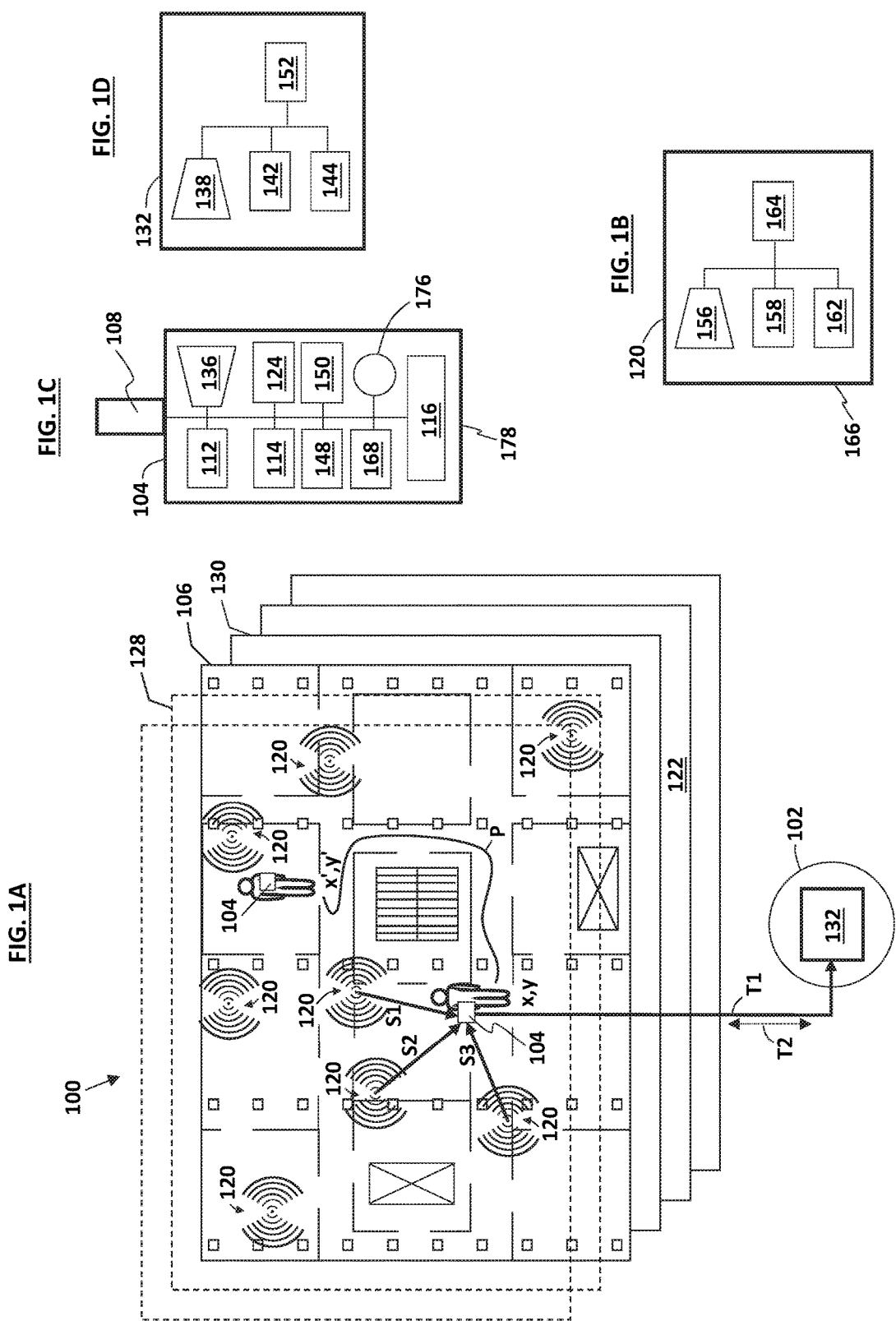
FIG. 1A is a schematic diagram of a tracking system to determine floor level and position of a location device inside a building according to an embodiment herein.
FIG. 1B illustrates a schematic diagram of an anchor transmitter according to an embodiment herein.
FIG. 1C illustrates a schematic diagram of a location device to determine floor level and position inside a building according to an embodiment herein.
FIG. 1D illustrates a schematic diagram of a processing system of the tracking system to determine floor level and position of a location device, inside a building according to an embodiment herein.
Figure 2:
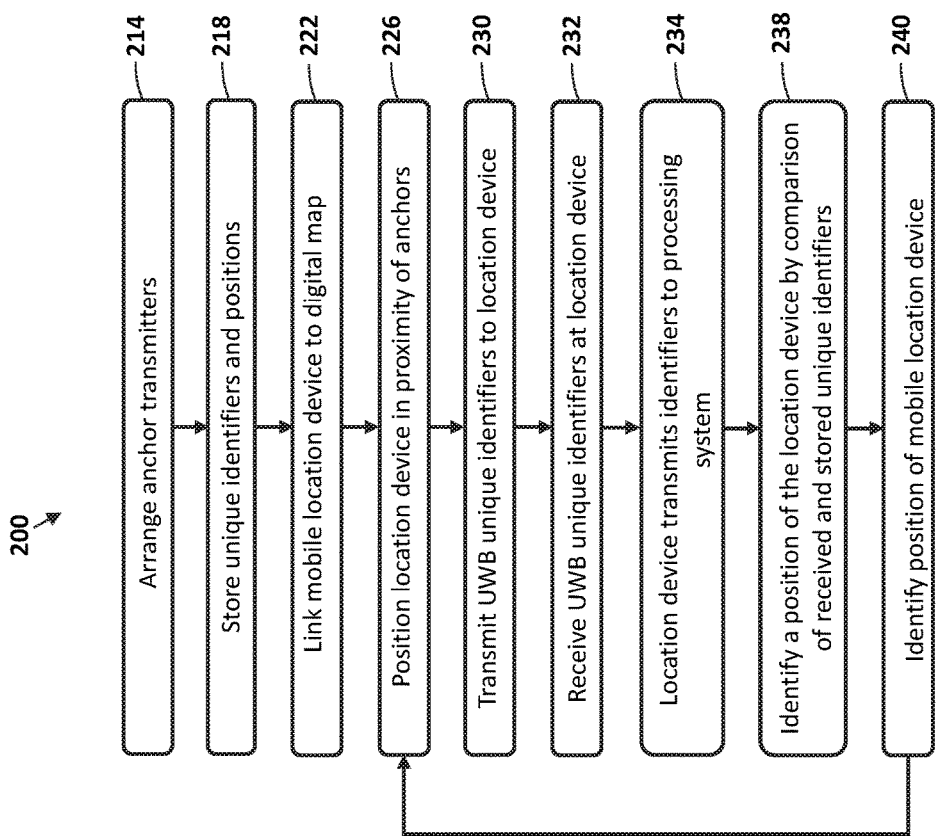
FIG. 2 is a flow diagram showing a method of determining a location device position according to an embodiment herein.

In the drawings, the size and relative sizes of layers and regions may be exaggerated for clarity. Referring now to the drawings, and more particularly to FIGS. 1A through 2, where similar reference characters denote corresponding features consistently throughout the figures, there are shown multiple embodiments of the current disclosure.

According to one embodiment, a location device, system, and method of using the same can be provided. More particularly, a multi-floor, multi-building, ultra-wideband (UWB) tracking device, system, and method of using the same are disclosed. According to these embodiments, objects, individuals, physical assets, and the like, or combinations thereof (hereinafter referred to as objects) can be located in physical space and tracked over time, throughout multiple buildings, and across multiple floors. Embodiments can focus on high value/low density tracking indoors and, in some instances, outdoors, where position technology, such as GPS, may not function reliably.

Embodiments herein can provide a low-cost tracking system to provide economical mass deployment of the system, which can be important in large scale environments such as military bases, institute campuses, commercial and government districts, and the like. According to the current disclosure, embodiments of the tracking system can be installed in every building to provide tracking and routing of first responders, since incidents can happen in any building with no prior notification. Tracking of first responders can reduce time to respond to a situation and increase situation awareness during an emergency situation, such as during a fire, a medical emergency, a chemical spill, a gas escape, or the like. In the embodiments disclosed herein, anchor transmitters can be used to provide localized identification or position information using low power, ultra-wideband signals. These signals can be analyzed or processed to determine a position in space at a given time or over a period of time, thereby allowing for tracking. These anchor transmitters can be of a low cost design, do not require network connections, and can be installed and deployed without disrupting existing infrastructure.

Embodiments herein use ultra-wideband (UWB) transmitters to determine a position of and to track persons or objects across multiple buildings and between floors in buildings. In one embodiment, as shown in FIG. 1A, a tracking system 100 can include (a) one or more anchor transmitters 120 that can broadcast, via UWB signals S1, S2, and S3, an identifier or position and (b) a location device 104 affixed to the person or object to compute position based, in part, on the identifier or position information in UWB signals S1, S2, and S3. The tracking system 100 further includes a communications backbone T1. In another embodiment, an operations center 102 having an operations center processing system 132 including a database and mapping software that can be used to compute the position. Tracking system 100 can have a low installation cost because of the low-cost anchor transmitters, and thereby allows for it to be deployed over several locations at comparatively less cost than conventional tracking systems. The location device 104 is used to determine the floor level 106 inside a building 122 and position x, y in two-dimensional space on floor level 106. The location device 104 can be configured as a mobile tracker device.

As shown in FIG. 1B, with reference to FIG. 1A, the anchor transmitter 120 can include a UWB radio module 156, power conversion electronics 158, battery pack 162, and microprocessor 164. The anchor transmitter UWB radio module 156, power conversion electronics 158, battery pack 162, and microprocessor 164 can be disposed in a small housing 166 which can be wall or ceiling mounted. If desired, the anchor transmitter 120 can be externally powered through the power conversion electronics. The anchor transmitter UWB radio module 156 can transmit the UWB signal S1, S2, or S3. The UWB signal S1, S2, or S3 can include data such as the anchor transmitter unique identifier and the anchor transmitter position, or the anchor transmitter unique identifier without the anchor transmitter position.

As shown in FIG. 1C, with reference to FIGS. 1A and 1B, the location device 104 can include a receiver 108, a distance unit 112 to calculate distance, a position unit 114 to calculate position, and a user interface 116. The receiver 108 can receive the plurality of UWB signals S1, S2, S3 from the plurality of anchor transmitters 120, the minimum number of which, in some aspects, is three. The distance unit 112 can analyze the received UWB signals S1, S2, S3 and determine a distance to each anchor transmitter 120, such as by using a time of flight (TOF) analysis. The position unit 114 can analyze the distance to each anchor transmitter 120 and determine, based on the distance to each anchor transmitter 120, a position in space for location device 104. The user interface 116 can notify a user of the determined position in space by, for example, displaying the digital map 142 (FIG. 1D) that designates the determined position with reference to the floor level 106 and an x, y position thereon.

The location device 104 can further include a storage device 124 to store at least one anchor transmitter identifier, such as a serial number and a predetermined position in space, for each anchor transmitter 120. The predetermined position in space of each anchor transmitter 120 can include building location, floor level, and an x, y position on the floor level 106. The position unit 114 can use the anchor transmitter identifier and the predetermined position in space of each anchor transmitter 120 to determine the position in space of the location device 104. The UWB signals S1, S2, S3 from the anchor transmitters 120 can include the anchor transmitter identifier for each anchor transmitter 120. The storage device 124 can also store a map of the position, and the determined position can be displayed on the map.

The location device 104 can be configured as a mobile tracker device and can include a receiver in UWB radio module 108, a microprocessor 148, and transmitter of communications module 136 to transmit communications, such as data, over any available network connection such as Wi-Fi®, ZigBee®, cellular, etc. Further, the location device 104 can be configured to receive communications, such as data, and can be internally or externally powered, such as by a battery 150. The location device 104 can further include power conversion electronics 168, battery pack 150, power switch 176, and the like. According to some embodiments herein, location device 104 electronics can be combined on a single circuit board, reducing size, and allowing for further reduction of production cost. The location device UWB radio module 108, power conversion electronics 168, battery pack 150, microprocessor 148, power switch 176, and communications module 136 can be disposed in a small case 178 which can be belt worn, carried in a pocket, or attached to equipment. In this sense, the location device 104 can be mobile. If desired, the location device 104 can be externally powered through the power conversion electronics 168, such as external battery packs shared with other mobile equipment, a Universal Serial Bus (USB) port of a laptop computer, micro-USB port of a cellphone/smartphone, or the like.

In an alternative embodiment, UWB signals S1, S2, S3 can include the predetermined position in space of the corresponding anchor transmitter 120, in which case the position unit 114 can determine the position in space x, y based on trilateration of the predetermined position for each anchor transmitter. Such an embodiment may not use a storage device 124 to store serial numbers, predetermined positions, or other anchor transmitter identifiers. Although it will be appreciated that, in embodiments that use a storage device 124 to store anchor transmitter identifiers, the security of system 100 can be enhanced because unauthorized use of the UWB signals S1, S2, S3 to determine a position in space can be limited without such identifiers. However, when the UWB signals S1, S2, S3 include the predetermined position in space of the corresponding anchor transmitter 120, system 100 may be considered an open system such that receiver 108, even when unauthorized to use system 100, can determine a position in space using the UWB signals S1, S2, S3 in the manners described herein.

While not required in all aspects, the distance unit 112 can use a time of flight (TOF) analysis of the UWB signals S1, S2, S3 to determine the distance to each anchor transmitter 120. The position unit 114 can analyze a first determined position in space x, y at a first time and analyze a second determined position in space x', y' at a second time and at a predetermined interval of time after the first time, to track a path "P" on floor level 106 or on several floor levels.

It should be appreciated that system 100 can be configured to focus on relatively high value/low density objects for tracking, both in indoor and outdoor environments. In such embodiments, system 100 can include low power anchor tags as anchor transmitters 120 and be deployed in a multi-floor, multi-building environment. Location device 104 can be embodied in a portable body-worn or carried tracker device that employs ultra-wide band radios for sub-meter localization, that is, for providing the x, y position of the location device 104 to within less than a meter. While anchor tags can be serialized and need not be programmed with predetermined position information, enabling the anchor tags to transmit position information allows for system 100 to operate as a direct or localized tracking system.

Determining position across multiple floors can be provided by capitalizing on the low power features of system 100, and in some embodiments, through unique serialization of anchor transmitters 120. An unexpected feature of the current invention is that low power UWB signals such as those provided by anchor transmitters 120 are not readily transmitted through walls and floors. That is, when travelling through walls and floors, low power UWB signals experience significant attenuation. Thus, while receiver 108 may receive multiple UWB signals from multiple floors in building 122, the strongest signals are usually those that are located on the same floor as location device 104. Thus, in some embodiments, location device 104 can be configured to use three or more of the strongest UWB signals for position and tracking purposes. When anchor transmitters 120 are serialized and associated with a particular floor in building 122, this information can be cross referenced to determine the floor on which location device 104 is positioned.

In some embodiments, where the location device 104 can be in control of the localization data, for example, when storage device 124 stores anchor transmitter identifiers and the predetermined positions in space of the anchor transmitters 120, the location device 104 can be private or controlled. Additionally, when the anchor transmitters 120 transmit their position, for example, in a building 122, the location device 104 can compute its own position on a self-stored map of the building 122. In such embodiments, a wireless communications network may not be needed. Once a position in space for location device 104 is determined, it can be transmitted via any available network to an operations center 102 for displaying position and historical tracking. Transmitting position information can allow for flexibility in how system 100 is employed. Beyond tracking, for example, once the position of an individual or object within a particular environment is known, that information can be used to provide destination routing information for the individual or object.

In an alternative embodiment, system 100 may not be a direct or localized tracking system. For example, and with reference to FIGS. 1A, 1B, and 1D, system 100 can include a processing system 132 at an operations center 102, that is communicatively coupled to location device 104, which can be a mobile tracking device. In the embodiment, the system 100 to determine floor level 106, 128, 130 and position x, y of the location device 104, inside a building 122 can include a plurality of anchor transmitters 120 arranged in predetermined positions, at least one location device 104, and a processing system 132 at an operations center 102. Each anchor transmitter 120 can include a unique identifier, and each anchor transmitter 120 can transmit its own unique identifier via UWB signal S1, S2, and S3 to the location device 104. The location device 104 can receive the UWB signals S1, S2, and S3 via receiver 108 and transmit, via transmitter 136 and signal T2, the unique identifiers to the processing system 132. Such transmissions can occur using any of a variety of communication networks, such as a cellular or Wi-Fi network communications backbone T1.

FIG. 1D, with reference to FIGS. 1A through 1C, illustrates the processing system 132. To receive the transmission of signal T2 from the location device 104, processing system 132 can include a receiver 138. The processing system 132 can also include a digital map 142 that stores the unique identifiers and the predetermined positions, so that when the location device 104 transmits the unique identifiers to the processing system 132, the processing system 132 can identify a position x, y of the location device 104, for example, based on a comparison of the unique identifiers received and the stored unique identifiers on the digital map 142.

The processing system 132 can further include a storage device 144 to store a plurality of anchor transmitter identifiers and a predetermined position in space for each anchor transmitter 120. For example, the plurality of anchor transmitter identifiers and predetermined position in space can be stored as part of a lookup table or database containing suitable information for matching, for each anchor transmitter 120, a predetermined anchor transmitter identifier to a predetermined position in space. The processing system 132 can determine a position of the location device 104 in space based on the matched predetermined position in space for each anchor transmitter 120. While not required in all aspects, the location device 104 can receive the UWB signals S1, S2, S3 from the anchor transmitters 120 inside a building 122, the anchor transmitters 120 can be situated in the building 122, and the tracked position x, y can be on a floor 106 in the building 122. An operations center display 152 is linked to the receiver 138, digital map 142, and storage device 144 such that the digital map 142 can be viewed on the display 152.

In some examples, the system 100 can include at least three anchor transmitters 120. The processing system 132 can analyze a time of flight (TOF) of received UWB signals S1, S2, S3 to determine the position of the location device 104. The location device 104 can transmit signal T2 to the processing system 132, including the time of flight (TOF) of the UWB signals S1, S2, S3 received by the location device 104. In other embodiments, as described above, location device 104 can be configured to analyze a time of flight (TOF) of received UWB signals S1, S2, S3 to determine the position of the location device 104.

In these embodiments, the anchor transmitter 120 can comprise a UWB radio transmitter and microprocessor which is battery powered, externally powered, or externally powered with a battery backup. The system 100 can use UWB radios to provide sub-meter two-dimensional (2D) localization, that is, identification of a position of the location device 104 within less than a meter, via time of flight transmissions and trilateration calculations between a minimum of three anchor transmitters and the location device 104. As indicated above, floor determination can be calculated based on which anchor transmitters 120 are most readily "observed" by the location device 104. Such anchor transmitters 120 can transmit a signal S1, S2, S3 including an identifier that can specify the floor on which the anchor transmitter is disposed. An embodiment of the system 100 can provide a sub-meter three-dimensional (3D) localization to be calculated using a minimum of four anchor transmitters 120 where at least one anchor transmitter is on a different floor than the other anchor transmitters 120, such as floor levels 128 and 130 in FIG. 1A.

The anchor transmitters 120 do not need to be programmed with position and can be merely serialized, that is, provided with a unique identifier. Transmitting the position of the anchor transmitters 120 by the anchor transmitters 120 themselves can provide an open localized tracking system as mentioned above. When each anchor transmitter 120 only transmits a unique identifier without a position of the anchor transmitter 120, the anchor transmitter positions can be entered in a processing system 132 of an operations center 102, mapping the position of each anchor transmitter 120 to a map 142 of the floor 106, building 122, base, campus, district, etc. When each anchor transmitter 120 only transmits a unique identifier without a position of the anchor transmitter 120, rapid relocation and replacement of anchor transmitters 120 can be provided and is a preferred embodiment of a method of operating the system 100. For example, an anchor transmitter 120 with the same unique identifier as a malfunctioning anchor transmitter can replace the malfunctioning anchor transmitter, or, for example, an anchor transmitter 120 can be relocated and the relocated position entered in the database associated with the unique identifier of the relocated anchor transmitter.

A network connection allows the location device 104 to pass the location device position, or time of flight information from the anchor transmitters 120 to an operations database, for example, stored on storage device 144, using existing data networks. For example, as described above, the transmitter 136 can transmit signal T2 to the receiver 138 over existing data networks. The location device 104 can also be connected to a portable computer device such as a cellphone, smartphone, tablet, laptop, or the like, to provide decentralized position identification, also referred to herein as localization, and tracking.

Additionally, the position data of a location device 104 can be updated on a periodic or non-periodic basis—such as every second or every few seconds—to allow for tracking a determined position for an individual or object as it changes over time. The operations center display 152 of the processing system 132 can allow an operations center user to know the position of many location devices, such as tracked individuals wearing or carrying a location device, or objects having a location device, across multiple buildings and floors.

The communications backbone T1 can be any existing Wi-Fi® or similar wireless network.

The processing system database can be a software package that can provide storage of both anchor transmitter positions, for example, associated with unique identifiers of the anchor transmitters, and location device historical positions, for example, tracking data of location devices, on a hard drive or other permanent storage device 144.

The visual display 152 can show the tracking device position data on the digital map 142 across multiple buildings and multiple floors within the buildings in real-time or as historical data. Such a display may appear, for example, as shown in FIG. 1A. The digital map 142 may be configured by a mapping software program that can be controlled by the processing system 132, stored on the storage device 144, and accessed by the processing system 132.

In an embodiment herein, a method 200 of determining the position of a location device 104 in a confined environment, such as a building 122, can be provided. Referring to FIG. 2, with reference to FIGS. 1A-1D, the method 200 can include arranging (214) a plurality of anchor transmitters 120 in predetermined positions. Each of these anchor transmitters 120 can have a unique identifier, and the method can include storing (218) the unique identifiers and the predetermined positions for position purposes, such as on a digital map 142 associated with a processing system 132 that can plot each anchor transmitter 120 on the map 142. The method can further include communicatively linking (222) at least one location device 104 to the digital map 142, positioning (226) the location device 104 in communicative proximity to the anchor transmitters 120, transmitting (230), by the plurality of anchor transmitters 120, a UWB signal S1, S2, S3 comprising the unique identifier from the anchor transmitters 120, receiving (232), at the location device 104, the UWB signals S1, S2, S3 having the unique identifiers from the anchor transmitters 120, transmitting (234) the unique identifiers to the processing system 132 via the location device 104, and identifying (238) a position x, y of the location device 104 via the processing system 132 based on a comparison of the unique identifiers received by the location device 104 and the stored unique identifiers on the digital map 142.

While not required in all aspects, identifying the position of the location device 104 can include trilateration based on the portion of the plurality of anchor transmitters 120 including at least three anchor transmitters 120.

In some aspects, the method of determining a location device 104 position x, y can include identifying (240) a path P in space of the location device 104 via the processing system 132 based on a comparison of the identified position x, y of the location device 104 at predetermined intervals of time.

The techniques provided by the embodiments herein may easily provide tracking of any high value person or asset within buildings or other confined environments. For example, nursing homes, hospitals, and personal residences can use the tracking system of the embodiments to provide accurate, current, and historical position of high risk persons, such as the elderly or very young. Aids or security personnel could use the tracking system described herein to provide the position of VIPs. Because the tracking system can transmit anchor transmitter positions, shopping centers or entertainment venues can provide maps which the patrons can use to self-locate and self-route, without providing their position to a centralized database. In general, this tracking system can be modified to support any application that relies on accurate and timely position in an indoor environment, a comparable sheltered environment, or an outdoor environment where other position services may not be reliable or otherwise available.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A location device comprising:
   a receiver configured to receive a plurality of ultra-wide band (UWB) signals from a plurality of anchor transmitters;
   a distance unit configured to determine a distance to each anchor transmitter using the received plurality of UWB signals;
   a position unit configured to analyze said distance to said each anchor transmitter and determine a position in space based on said distance to said each anchor transmitter; and a user interface configured to notify a user of said determined position in space,
wherein a power level of the ultra-wide band signal is sufficiently low as to not be readily transmitted through walls and floors.

2. The device of claim 1, further comprising:
a storage device configured to store at least one anchor transmitter identifier and a predetermined position in space for said each anchor transmitter,
wherein said position unit is further configured to determine said position in space based on said predetermined position in space for each anchor transmitter.

3. The device of claim 2, wherein said received plurality of UWB signals from said plurality of anchor transmitters comprise said anchor transmitter identifier for each anchor transmitter.

4. The device of claim 1, wherein each received UWB signal comprises a predetermined position in space of said corresponding anchor transmitter for each anchor transmitter, and wherein said position unit is configured to determine said position in space based on said received predetermined position in space for each anchor transmitter.

5. The device of claim 1, wherein said plurality of anchor transmitters comprises at least three anchor transmitters.

6. The device of claim 1, further comprising a storage device configured to store a map of a position, wherein said position in space is mapped to a position on said map via the user interface.

7. The device of claim 1, wherein said receiver is configured to receive said plurality of UWB signals from said plurality of anchor transmitters inside a building, and wherein said position is inside said building.

8. The device of claim 1, wherein said distance unit is configured to analyze a time of flight (TOF) of said received plurality of UWB signals to determine said distance to each anchor transmitter based on said TOF analyses.

9. The device of claim 1, wherein said position unit is configured to
analyze a first determined position in space at a first time and a second determined position in space at a second time, and
track a path in space based on said first and second determined positions in space.

10. A mobile device, comprising:
the location device of claim 1; and
a mobile housing,
wherein said location device is disposed in said mobile housing.

11. A tracking system comprising:
a plurality of anchor transmitters arranged in predetermined positions, wherein each anchor transmitter comprises a unique identifier, wherein said plurality of anchor transmitters are each configured to transmit an ultra-wide band (UWB) signal comprising said unique identifier;
at least one location device configured to receive said UWB signals comprising said unique identifiers, and configured to transmit said unique identifiers; and
a processing system comprising a digital map that stores said unique identifiers and said predetermined positions, wherein said processing system is configured to receive said unique identifiers from said at least one location device, and wherein said processing system is configured to identify a position of said at least one location device based on a comparison of said unique identifiers received by said at least one location device and the stored unique identifiers on said digital map,
wherein a power level of the ultra-wide band signal is sufficiently low as to not be readily transmitted through walls and floors.

12. The tracking system of claim 11, wherein said processing system further comprises a storage device configured to store a plurality of anchor transmitter identifiers and a predetermined position in space for each anchor transmitter.

13. The tracking system of claim 12, wherein said processing system is configured to determine a position of said at least one location device in space based on the predetermined position in space for each anchor transmitter.

14. The tracking system of claim 13, wherein said at least one location device is configured to receive said plurality of UWB signals from said plurality of anchor transmitters inside a building, wherein said plurality of anchor transmitters are disposed inside said building, and wherein said tracked position is inside said building.

15. The tracking system of claim 11, wherein said plurality of anchor transmitters comprises at least three anchor transmitters.

16. The tracking system of claim 11, wherein said processing system is configured to analyze a time of flight (TOF) of received said plurality of UWB signals to determine said position of said at least one location device.

17. The tracking system of claim 11, wherein said at least one location device is configured to transmit to said processing system a time of flight (TOF) of said plurality of UWB signals received by said at least one location device.

18. A method of locating comprising:
arranging a plurality of anchor transmitters in a plurality of predetermined positions, wherein each anchor transmitter comprises a unique identifier;
storing, in a processing system, said each unique identifier and said predetermined position for each anchor transmitter on a digital map stored;
communicatively linking at least one location device to said digital map;
positioning said at least one location device in communicative proximity to said plurality of anchor transmitters;
transmitting low power ultra-wide band (UWB) signals comprising said unique identifier from said plurality of anchor transmitters;
receiving, in said at least one location device, said UWB signals comprising said unique identifiers from at least a portion of said plurality of anchor transmitters;
transmitting said unique identifiers to said processing system via the at least one location device; and
identifying, via said processing system, a position of said at least one location device based on a comparison of said unique identifiers received by said at least one location device and the stored unique identifiers on said digital map,
wherein the low power ultra-wide band signals are not be readily transmitted through walls and floors.

19. The method of claim 18, wherein said identifying said position of said at least one location device comprises using trilateration based on said portion of said plurality of anchor transmitters comprising at least three anchor transmitters.

20. The method of claim 18, further comprising identifying, via said processing system, a path in space of said at least one location device based on a comparison of said identified position of said at least one location device at predetermined intervals of time.

* * * * *